United States Patent
Lu et al.

(10) Patent No.: US 11,050,934 B2
(45) Date of Patent: *Jun. 29, 2021

(54) METHOD FOR DISPLAYING VIDEO IMAGES FOR A VEHICULAR VISION SYSTEM

(71) Applicant: MAGNA ELECTRONICS INC., Auburn Hills, MI (US)

(72) Inventors: Yuesheng Lu, Farmington Hills, MI (US); Richard D. Shriner, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,783

(22) Filed: Feb. 24, 2020

(65) Prior Publication Data

US 2020/0252546 A1 Aug. 6, 2020

Related U.S. Application Data

(63) Continuation of application No. 16/105,195, filed on Aug. 20, 2018, now Pat. No. 10,574,885, which is a (Continued)

(51) Int. Cl.
*H04N 5/232* (2006.01)
*H04N 5/247* (2006.01)
(Continued)

(52) U.S. Cl.
CPC ......... *H04N 5/23238* (2013.01); *B32B 17/10* (2013.01); *B32B 17/10036* (2013.01);
(Continued)

(58) Field of Classification Search
CPC .... H04N 5/23238; H04N 5/247; B32B 17/10; B32B 17/10477; B32B 17/10036;
(Continued)

(56) References Cited

U.S. PATENT DOCUMENTS 4,987,357 A 1/1991 Masaki
4,987,410 A 1/1991 Berman et al.
(Continued)

FOREIGN PATENT DOCUMENTS

EP 0640903 A1 3/1995
EP 2377094 A1 10/2011
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Tat C Chio
(74) *Attorney, Agent, or Firm* — Honigman LLP

(57) ABSTRACT

A method for displaying video images includes providing a plurality of cameras and an ECU at the vehicle. The cameras are in communication with one another via a vehicle network and the ECU is in communication with the cameras via respective data lines. During a driving maneuver of the vehicle, one of the cameras is designated as and functions as a master camera and other cameras are designated as and function as slave cameras. During the driving maneuver, automatic control of exposure, gain and white balance parameters of the designated master camera is enabled, and the exposure, gain and white balance parameters of the designated master camera are communicated to the designated slave cameras via the vehicle network. A composite image is displayed that provides bird's eye view video images derived from video image data captured by at least the designated master camera and the designated slave cameras.

22 Claims, 6 Drawing Sheets

Related U.S. Application Data continuation of application No. 15/707,025, filed on Sep. 18, 2017, now Pat. No. 10,057,489, which is a continuation of application No. 15/361,749, filed on Nov. 28, 2016, now Pat. No. 9,769,381, which is a continuation of application No. 14/269,788, filed on May 5, 2014, now Pat. No. 9,508,014.

(60) Provisional application No. 61/819,835, filed on May 6, 2013.

(51) Int. Cl.
  B60R 1/00 (2006.01)
  B32B 17/10 (2006.01)
  E06B 9/24 (2006.01)
  G06K 9/00 (2006.01)
  G02F 1/01 (2006.01)
  G02F 1/00 (2006.01)
  G06K 9/20 (2006.01)

(52) U.S. Cl.
  CPC .. *B32B 17/10477* (2013.01); *B32B 17/10651* (2013.01); *B32B 17/10761* (2013.01); *B60R 1/00* (2013.01); *E06B 9/24* (2013.01); *G02F 1/009* (2013.01); *G02F 1/0147* (2013.01); *G06K 9/00791* (2013.01); *H04N 5/247* (2013.01); *B60R 2300/105* (2013.01); *B60R 2300/303* (2013.01); *B60R 2300/50* (2013.01); *B60R 2300/605* (2013.01); *B60R 2300/607* (2013.01); *B60R 2300/70* (2013.01); *G06K 9/2027* (2013.01)

(58) Field of Classification Search
  CPC ......... B32B 17/10651; B32B 17/10761; E06B 9/24; G06K 9/00791; G06K 9/2027; G02F 1/0147; G02F 1/009; B60R 1/00; B60R 2300/605; B60R 2300/70; B60R 2300/105; B60R 2300/303; B60R 2300/607; B60R 2300/50
  See application file for complete search history.

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,351,044 A | 9/1994 | Mathur et al. |
| 5,355,118 A | 10/1994 | Fukuhara |
| 5,359,666 A | 10/1994 | Nakayama et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,559,695 A | 9/1996 | Daily |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,638,116 A | 6/1997 | Shimoura et al. |

(56) References Cited

U.S. PATENT DOCUMENTS

| | | |
|---|---|---|
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,904,725 A | 5/1999 | Iisaka et al. |
| 5,914,815 A | 6/1999 | Bos |
| 5,920,367 A | 7/1999 | Kajimoto et al. |
| 5,923,027 A | 7/1999 | Stam et al. |
| 5,938,810 A | 8/1999 | De Vries, Jr. et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,990,469 A | 11/1999 | Bechtel et al. |
| 5,990,649 A | 11/1999 | Nagao et al. |
| 6,009,336 A | 12/1999 | Harris et al. |
| 6,020,704 A | 2/2000 | Buschur |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,097,024 A | 8/2000 | Stam et al. |
| 6,100,811 A | 8/2000 | Hsu et al. |
| 6,139,172 A | 10/2000 | Bos et al. |
| 6,144,022 A | 11/2000 | Tenenbaum et al. |
| 6,158,655 A | 12/2000 | DeVries, Jr. et al. |
| 6,175,300 B1 | 1/2001 | Kendrick |
| 6,201,642 B1 | 3/2001 | Bos |
| 6,222,460 B1 | 4/2001 | DeLine et al. |
| 6,226,061 B1 | 5/2001 | Tagusa |
| 6,243,003 B1 | 6/2001 | DeLine et al. |
| 6,250,148 B1 | 6/2001 | Lynam |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,333,759 B1 | 12/2001 | Mazzilli |
| 6,359,392 B1 | 3/2002 | He |
| 6,370,329 B1 | 4/2002 | Teuchert |
| 6,396,397 B1 | 5/2002 | Bos et al. |
| 6,411,328 B1 | 6/2002 | Franke et al. |
| 6,424,273 B1 | 7/2002 | Gutta et al. |
| 6,430,303 B1 | 8/2002 | Naoi et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,693,524 B1 | 2/2004 | Payne |
| 6,700,605 B1 | 3/2004 | Toyoda et al. |
| 6,703,925 B2 | 3/2004 | Steffel |
| 6,704,621 B1 | 3/2004 | Stein et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,744,353 B2 | 6/2004 | Sjonell |
| 6,757,109 B2 | 6/2004 | Bos |
| 6,762,867 B2 | 7/2004 | Lippert et al. |
| 6,795,221 B1 | 9/2004 | Urey |
| 6,807,287 B1 | 10/2004 | Hermans |
| 6,823,241 B2 | 11/2004 | Shirato et al. |
| 6,824,281 B2 | 11/2004 | Schofield et al. |
| 6,847,487 B2 | 1/2005 | Burgner |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,133,661 B2 | 11/2006 | Hatae et al. |
| 7,149,613 B2 | 12/2006 | Stam et al. |
| 7,151,996 B2 | 12/2006 | Stein |

(56) References Cited

U.S. PATENT DOCUMENTS

| | | |
|---|---|---|
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,375,803 B1 | 5/2008 | Bamji |
| 7,423,821 B2 | 9/2008 | Bechtel et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 | 5/2010 | Higgins-Luthman |
| 7,786,898 B2 | 8/2010 | Stein et al. |
| 7,843,451 B2 | 11/2010 | Lafon |
| 7,855,778 B2 | 12/2010 | Yung et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,553,088 B2 | 10/2013 | Stein et al. |
| 9,508,014 B2 | 11/2016 | Lu et al. |
| 9,769,381 B2* | 9/2017 | Lu ................ G06K 9/00791 |
| 10,057,489 B2* | 8/2018 | Lu ................ B32B 17/10761 |
| 10,574,885 B2* | 2/2020 | Lu ................ G02F 1/009 |
| 2001/0002451 A1 | 5/2001 | Breed |
| 2002/0005778 A1 | 1/2002 | Breed et al. |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2007/0285282 A1 | 12/2007 | Nakayama et al. |
| 2008/0043099 A1 | 2/2008 | Stein et al. |
| 2008/0147321 A1 | 6/2008 | Howard et al. |
| 2008/0186382 A1 | 8/2008 | Tauchi et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2011/0216201 A1 | 9/2011 | McAndrew et al. |
| 2011/0310219 A1 | 12/2011 | Kim et al. |
| 2012/0045112 A1 | 2/2012 | Lundblad et al. |
| 2012/0069185 A1 | 3/2012 | Stein |
| 2012/0194735 A1 | 8/2012 | Luo |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |

FOREIGN PATENT DOCUMENTS

| | | |
|---|---|---|
| JP | 58110334 | 6/1983 |
| JP | 59114139 | 7/1984 |
| JP | 6080953 | 5/1985 |
| JP | 6414700 | 1/1989 |
| JP | H1168538 A | 7/1989 |
| JP | H236417 | 8/1990 |
| JP | H2117935 A | 9/1990 |
| JP | 03099952 | 4/1991 |
| JP | 6227318 B2 | 8/1994 |
| JP | 07105496 | 4/1995 |
| JP | 2630604 | 7/1997 |
| JP | 200274339 A | 3/2002 |
| JP | 2003083742 A | 3/2003 |
| JP | 20041658 A | 1/2004 |
| JP | 6216073 B2 | 10/2017 |

OTHER PUBLICATIONS

Broggi et al., "Multi-Resolution Vehicle Detection using Artificial Vision," IEEE Intelligent Vehicles Symposium of Jun. 2004.

Broggi et al., "Self-Calibration of a Stereo Vision System for Automotive Applications", Proceedings of the 2001 IEEE International Conference on Robotics & Automation, Seoul, KR, May 21-26, 2001.

Miro, "Real-Time Image Stitching for Automotive 360° Vision Systems", Audio Visual Engineering, Barcelona, Jul. 2014.

Porter et al., "Compositing Digital Images," Computer Graphics (Proc. Siggraph), vol. 18, No. 3, pp. 253-259, Jul. 1984.

Stenkula, "Vehicle Vicinity from Above: a study of All-Around Environment Displaying System for Heavy Vehicles", Master of Science Thesis, Stockholm, SE 2009.

Szeliski, Image Mosaicing for Tele-Reality Applications, DEC Cambridge Research Laboratory, CRL 94/2, May 1994.

Wolberg, "A Two-Pass Mesh Warping Implementation of Morphing," Dr. Dobb's Journal, No. 202, Jul. 1993.

Wolberg, Digital Image Warping, IEEE Computer Society Press, 1990.

* cited by examiner

METHOD FOR DISPLAYING VIDEO IMAGES FOR A VEHICULAR VISION SYSTEM

CROSS REFERENCE TO RELATED APPLICATIONS

The present application is a continuation of U.S. patent application Ser. No. 16/105,195, filed Aug. 20, 2018, now U.S. Pat. No. 10,574,885, which is a continuation of U.S. patent application Ser. No. 15/707,025, filed Sep. 18, 2017, now U.S. Pat. No. 10,057,489, which is a continuation of U.S. patent application Ser. No. 15/361,749, filed Nov. 28, 2016, now U.S. Pat. No. 9,769,381, which is a continuation of U.S. patent application Ser. No. 14/269,788, filed May 5, 2014, now U.S. Pat. No. 9,508,014, which claims the filing benefits of U.S. provisional application Ser. No. 61/819,835, filed May 6, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes a plurality of cameras (preferably one or more CMOS cameras) to capture image data representative of images exterior of the vehicle, and provides a multi-camera vision system image balancing technique that is easier to implement and cost-effective and provides improved image balancing performance.

The vision system or imaging system of the present invention utilizes multiple cameras to capture image data representative of images exterior of the vehicle, and provides the communication/data signals, including camera data or captured image data, that may be displayed at a display screen that is viewable by the driver of the vehicle, such as when the driver is parking the vehicle and/or backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

The present invention provides a vision system that selects a camera of the plurality of cameras to be a master camera, whereby the operating parameters determined by or suitable for the images or image data captured by the selected master camera are applied to or used by the other cameras or applied to the image data captured by the other cameras of the plurality of cameras. By using one camera's operating parameters for all of the cameras, image balancing at the junctions of the merged or stitched images of the surround view displayed image are enhanced. The present invention provides such enhancement while reducing overall costs of the system, because no control unit image signal processing (ISP) control algorithms are needed, thus avoiding ISP development cost and royalty cost.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
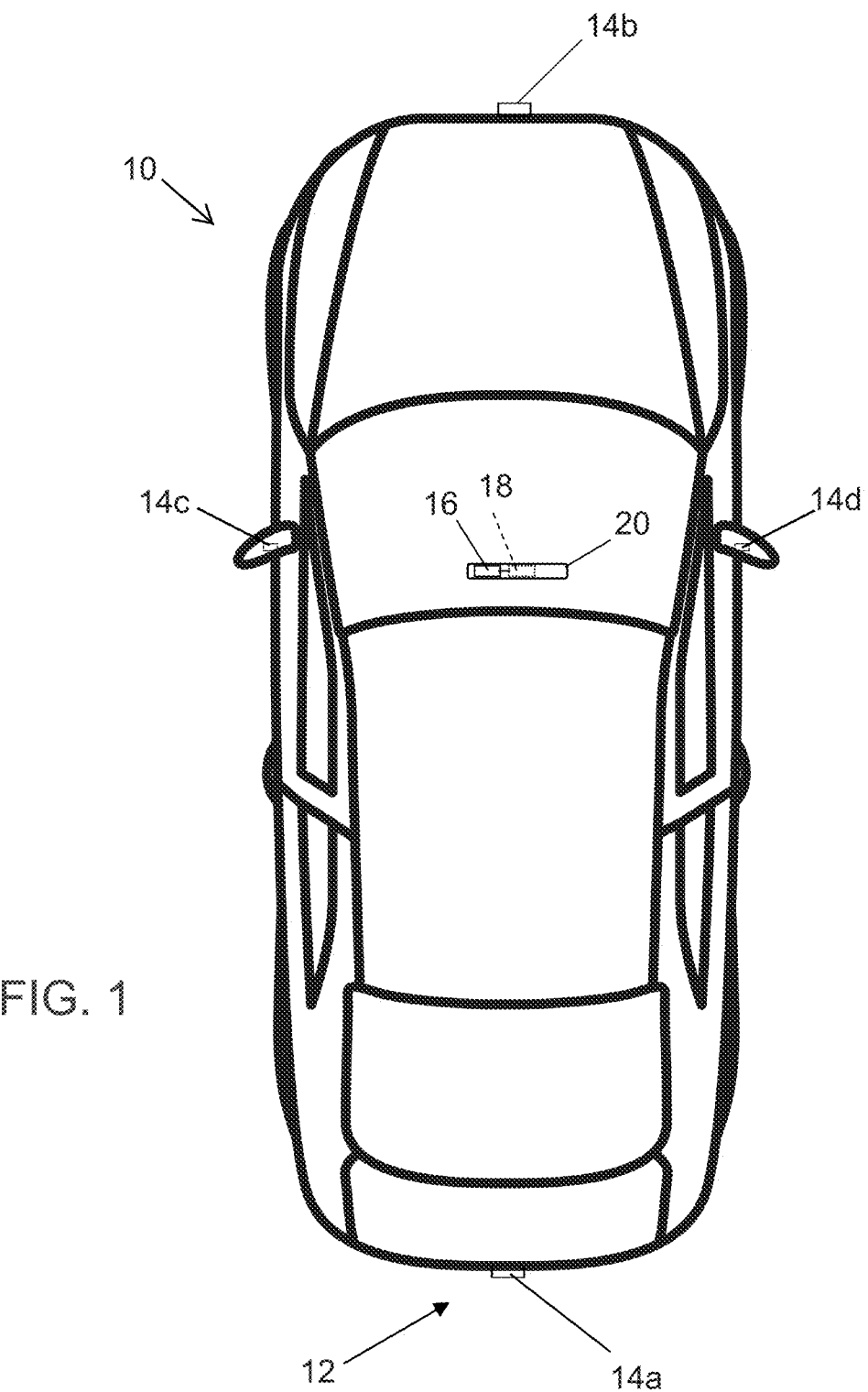
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle, such as at or in respective exterior rearview mirror assemblies at the sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 3:
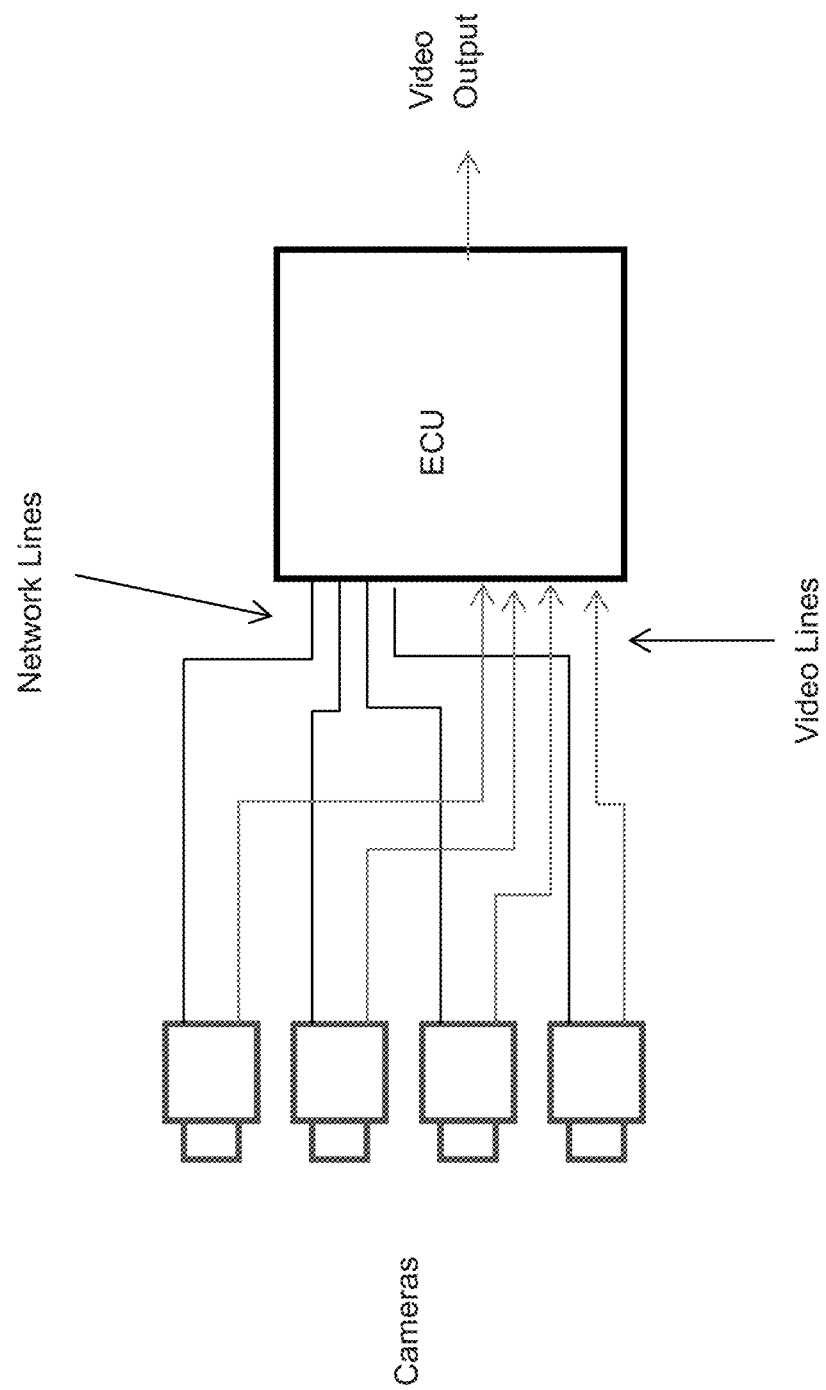
FIG. 3 is a schematic of a vision system, with the ISP algorithms running in ECU and controlling all cameras through network link.

In a multi-camera surround view system, the sections of a bird's-eye-view (BEV) image derived from image data captured by multiple cameras may appear to have different brightness and color (such as described, for example, in U.S. Pat. No. 7,714,887, which is hereby incorporated herein by reference in its entirety). The current technique to balancing the BEV image to deliver generally uniform brightness and color at the section border areas involves the surround view control unit (such as an electronic control unit or ECU) controlling camera exposure and color parameters of all cameras through the network connections to the cameras. This technique requires image signal processing (ISP) algorithms running in the ECU (see, for example, FIG. 3). Normally, ISP algorithms are tied tightly with the imager sensor and run on a processor in the same silicon die of the imager, or in a companion chip placed next to the image sensor inside the camera. In the ECU, the ISP algorithms may run on a different type of processor (such as, for example, a field programmable gate array (FPGA) or an ARM core or any other suitable type of microprocessor). It takes extra software development effort to port the imager ISP algorithms from the imager ISP processor to the ECU processor, and involves paying royalty of ISP to the imager ISP provider. For the ECU supplier, development of a home-grown ISP core in the ECU processor, without the detailed knowledge of the image sensor and ISP algorithms, the performance of the ISP may not be as good as the imager ISP. A reason for this is that the imager ISP involves with complex control mechanisms, and the access of intimate knowledge of imager registers and performance tuning skills.

The present invention involves using existing ISP of one of the cameras to control the rest of the cameras of the vision system. One of the cameras is configured as the "master" camera, and the rest of the cameras are configured as "slave" cameras. The master camera's ISP imager control commands are sent or communicated over network links to all the slave cameras for slave ISP controls. As a result, all of the cameras will have a balanced BEV image. With this technique, no ECU ISP control algorithms are needed, thus avoiding ISP development cost and royalty cost, while enhancing or optimizing the ISP performance and BEV image balancing performance.

Figure 2:
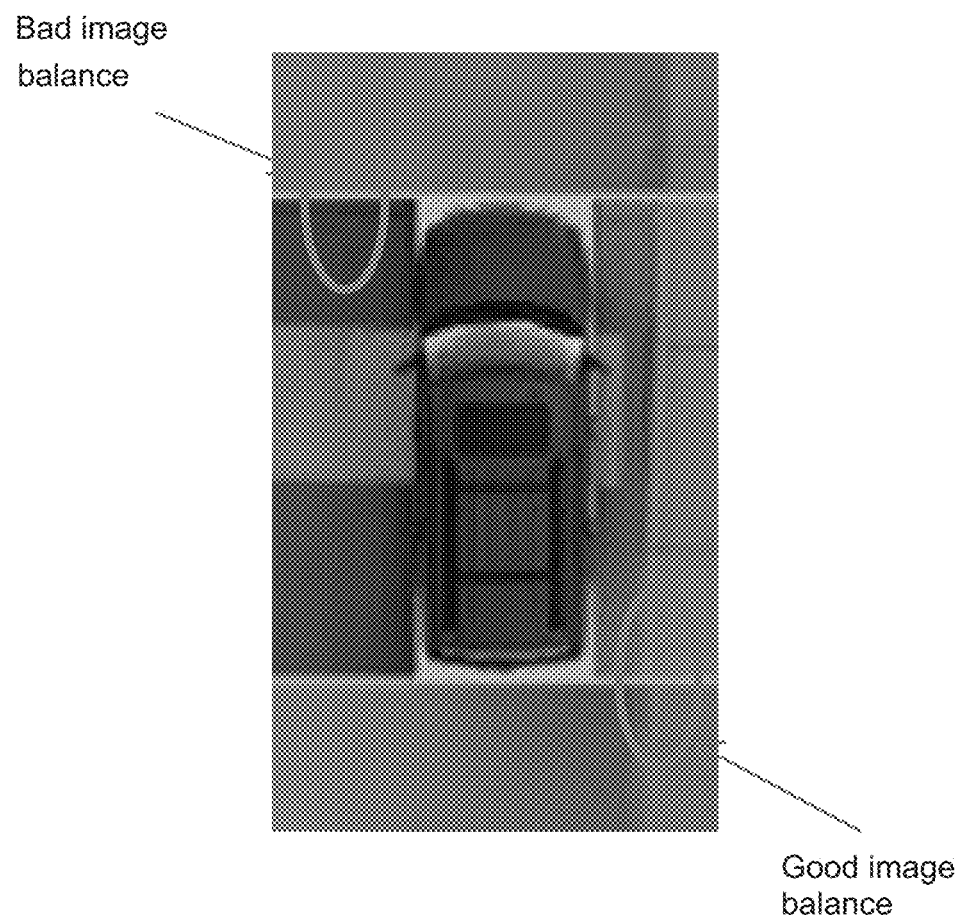
FIG. 2 is a bird's eye view image showing good and bad image balance at the border areas.

The goal of BEV image balancing is to make the image sections from different cameras appear uniform in brightness and color at the borders of the sections. FIG. 2 shows an example of a BEV image that has good image balance (such as at the rear right corner of the vehicle) and bad image balance (such as at the left front corner of the vehicle) at the border areas.

In accordance with the present invention, an alternative technique is proposed and implemented, which involves a master-slave camera configuration. An ISP is running in the master camera which determines proper parameters that control camera performances, such as, for example, brightness, color, dynamic range, and/or the like. All of the slave cameras are controlled by the ISP algorithms of the master camera. By being controlled with a single ISP, all of the cameras have the same image performances, which include brightness, color, dynamic range, and/or the like, if they are facing the same scene. At the BEV camera divider border areas, the image brightness and color uniformity are substantially or generally maintained.

Figure 4:
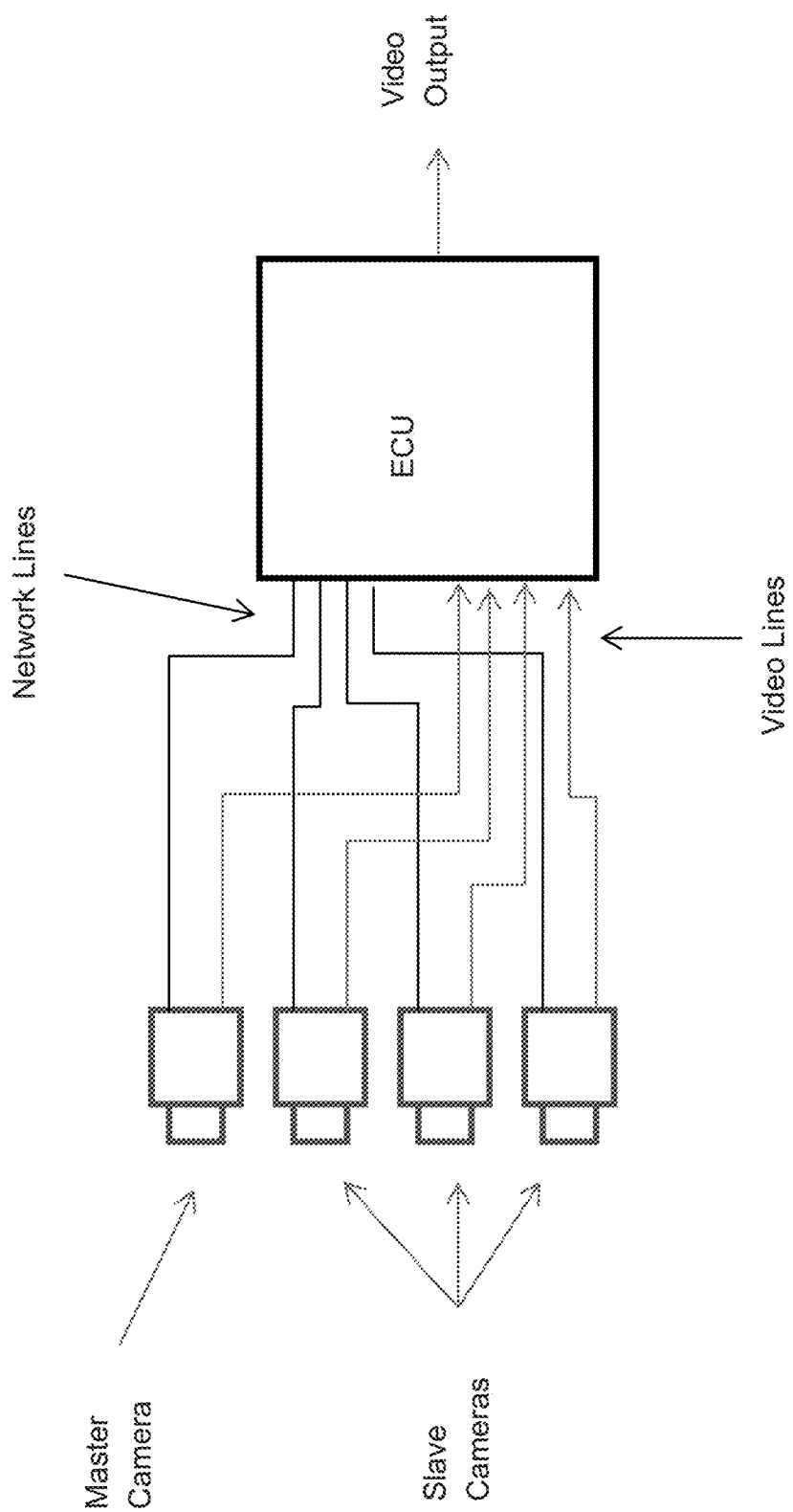
FIG. 4 is a schematic of a vision system with a master camera, with the other cameras in the system being slave cameras, with one part of the ECU acting as a network gateway or controller.
Figure 5:
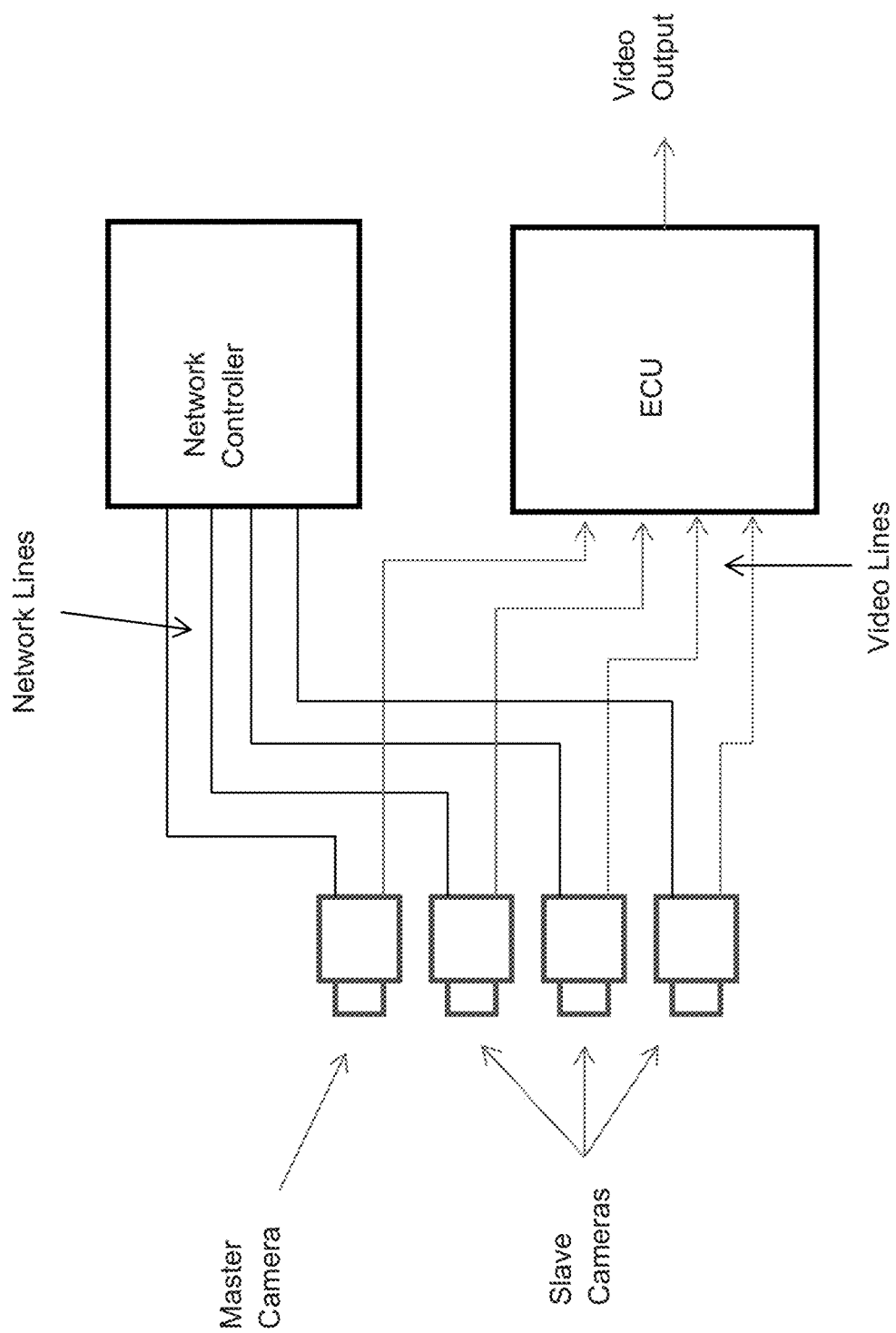
FIG. 5 is a schematic of a vision system with one master camera, with the other cameras in the system being slave cameras, and with a separate network controller outside of the ECU acting as a network gateway or controller, wherein the separated network controller can be a part of a different vehicle ECU that already exists.
Figure 6:
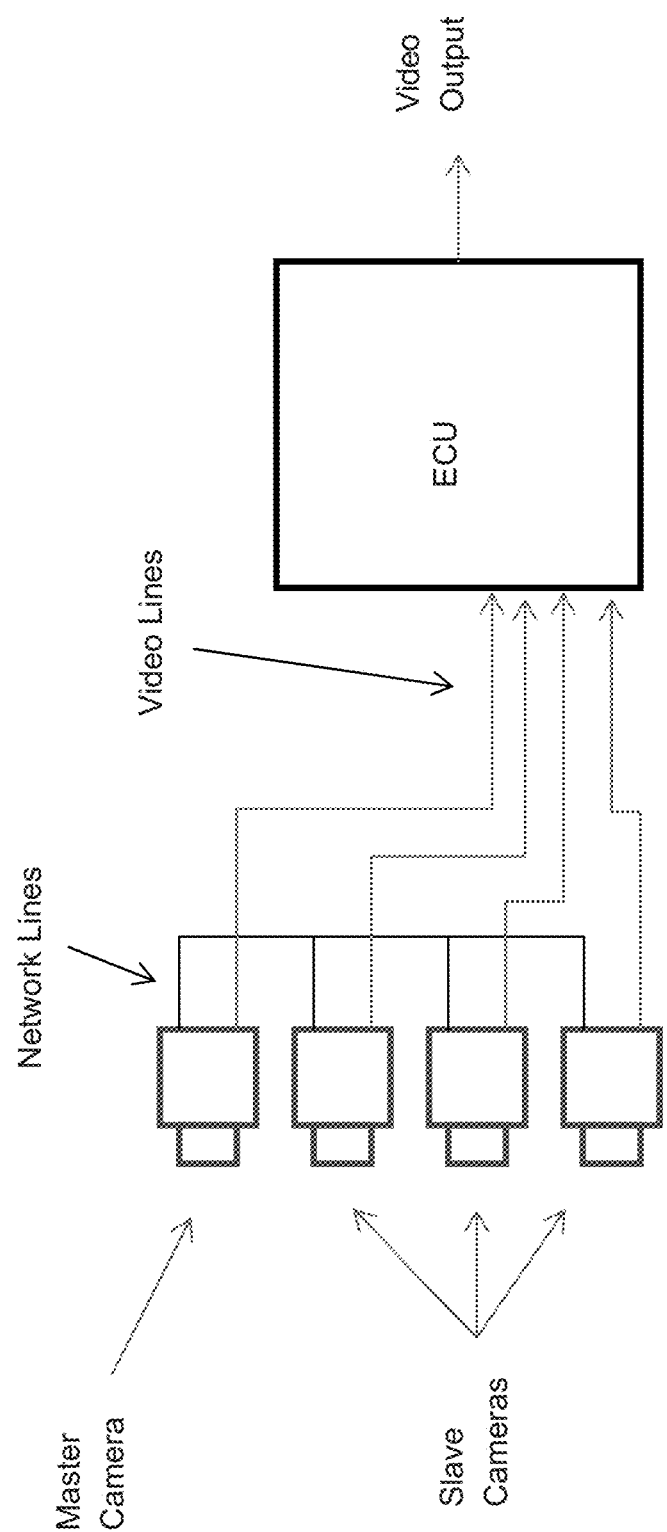
FIG. 6 is a schematic of a vision system with one master camera, with the other cameras in the system being slave cameras, and with the master camera acting as a network gateway or controller.

This technique can be applied to two or more cameras that are used in a multi-camera surround view system or similar systems. The multi-camera system may be in a vehicle to assist driver parking or to provide a security monitoring system that involves multiple cameras installed at multiple angles and locations, and that may provide composite image (comprising portions of images captured by multiple cameras), such as a continuous/seamless and stitched view image having images captured by the multiple cameras stitched together in a generally or substantially seamless manner (such as described in U.S. Pat. No. 7,859,565, which is hereby incorporated herein by reference in its entirety). With such a vision system, all of the vehicle cameras are connected or linked through a network connection. The network connection may comprise a vehicle CAN bus, LIN bus, Ethernet bus, wireless networks, UART connection or other types of suitable network links. The topologies of the network connection may comprise star, daisy chain, or other suitable topologies. For the network connection between the cameras, there is a network hub or switch or gateway that routes the camera ISP control commands from the master camera to the slave cameras. With the daisy chain topology, there are distributed network gateways at each camera node. The hub/switch/gateway may be a part of the multi-camera ECU, a part of a separate and existing ECU in vehicle, a separate network controller, or inside the master camera, or other means. These configurations are depicted in FIGS. 4-6.

The camera ISP control may be in the form of writing registers to the imager/camera (such as a CMOS photosensor array of photosensing elements or pixels), sending commands to the imager, or other suitable means. As an example of master-slave control technique, the master is running in its normal mode (in other words, with automatic exposure control, gain control and white balance/color control modes), while the slave cameras are running with all above mentioned auto controls turned off. The microprocessor inside the hub/switch/gateway reads all relevant control registers from the master camera and sends them over network connection and writes these registers to the imagers or circuitry inside the slave cameras with fast enough speed. The master camera controls the slave cameras in real time with the same set of imager control parameters, and thus all of the cameras produce the same image performances in terms of exposure/gain, color, dynamic range, and/or the like. For a multi-camera system that employs these cameras, a uniformly bordered or continuous brightness and color BEV image can be reached.

The master camera may be any one of the multiple cameras of the vision system, and the system or user may select which camera acts as the master camera for a given application. Depending on the viewing mode of the multi-camera system, the network controller can assign any one of the cameras as the master and the rest of cameras as slaves. For example, with a viewing mode that includes a BEV image and an image captured by the rear view camera, the rear view camera may be selected as the master camera. In another example, with a viewing mode that includes a BEV image and an image captured by a front view camera, the front view camera may be selected as the master camera. When the ECU makes a viewing mode change, selection of master and slave decision may be made by the ECU and the configuration commands may be sent to all of the cameras to re-configure them to suitable master and slave modes.

The multi-camera vision system includes two or more cameras, such as a rearward viewing camera and a driver side sideward viewing camera and a passenger side sideward viewing camera, whereby the system may synthesize a composite image derived from image data captured by at least two of the cameras. Optionally, the vision system may utilize a forward viewing camera and the rearward viewing camera and the sideward viewing cameras disposed at the vehicle with exterior fields of view, and may be part of or may provide a display of a top-down view or bird's eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/242,038, filed Apr. 1, 2014, now U.S. Pat. No. 9,487,159; Ser. No. 14/229,061, filed Mar. 28, 2014 and published Oct. 2, 2014 as U.S. Publication No. US-2014-0293042; Ser. No. 14/343,937, filed Mar. 10, 2014 and published Aug. 21, 2014 as U.S. Publication No. US-2014-0232872; Ser. No. 14/343,936, filed Mar. 10, 2014 and published Aug. 7, 2014 as U.S. Publication No. US-2014-0218535; Ser. No. 14/195,135, filed Mar. 3, 2014 and published Sep. 4, 2014 as U.S. Publication No. US-2014-0247354; Ser. No. 14/195,136, filed Mar. 3, 2014 and published Sep. 4, 2014 as U.S. Publication No. US-2014-0247355; Ser. No. 14/191,512, filed Feb. 27, 2014 and published Sep. 4, 2014 as U.S. Publication No. US-2014-0247352; Ser. No. 14/183,613, filed Feb. 19, 2014, now U.S. Pat. No. 9,445,057; Ser. No. 14/169,329, filed Jan. 31, 2014 and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014 and published Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013 and published Jun. 12, 2014 as U.S. Publication No. US-2014-0160276; Ser. No. 14/102,980, filed Dec. 11, 2013 and published Jun. 19, 2014 as U.S. Publication No. US-2014-0168437; Ser. No. 14/098,817, filed Dec. 6, 2013 and published Jun. 19, 2014 as U.S. Publication No. US-2014-0168415; Ser. No. 14/097,581, filed Dec. 5, 2013 and published Jun. 12, 2014 as U.S. Publication No. US-2014-0160291; Ser. No. 14/093,981, filed Dec. 2, 2013, now U.S. Pat. No. 8,917,169; Ser. No. 14/093,980, filed Dec. 2, 2013 and published Jun. 5, 2014 as U.S. Publication No. US-2014-0152825; Ser. No. 14/082,573, filed Nov. 18, 2013 and published May 22, 2014 as U.S. Publication No. US-2014-0139676; Ser. No. 14/082,574, filed Nov. 18, 2013, now U.S. Pat. No. 9,307,640; Ser. No.

14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013 and published Apr. 17, 2014 as U.S. Publication No. US-2014-0104426; Ser. No. 14/046,174, filed Oct. 4, 2013 and published Apr. 10, 2014 as U.S. Publication No. US-2014-0098229; Ser. No. 14/016,790, filed Sep. 3, 2013 and published Mar. 6, 2014 as U.S. Publication No. US-2014-0067206; Ser. No. 14/036,723, filed Sep. 25, 2013 and published Mar. 27, 2014 as U.S. Publication No. US-2014-0085472; Ser. No. 14/016,790, filed Sep. 3, 2013 and published Mar. 6, 2014 as U.S. Publication No. US-2014-0067206; Ser. No. 14/001,272, filed Aug. 23, 2013, now U.S. Pat. No. 9,233,641; Ser. No. 13/970,868, filed Aug. 20, 2013 and published Feb. 20, 2014 as U.S. Publication No. US-2014-0049646; Ser. No. 13/964,134, filed Aug. 12, 2013, now U.S. Pat. No. 9,340,227; Ser. No. 13/942,758, filed Jul. 16, 2013 and published Jan. 23, 2014 as U.S. Publication No. US-2014-0025240; Ser. No. 13/942,753, filed Jul. 16, 2013 and published Jan. 30, 2014 as U.S. Publication No. US-2014-0028852; Ser. No. 13/927,680, filed Jun. 26, 2013 and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013 and published Nov. 28, 2013 as U.S. Publication No. US-2013-0314503; Ser. No. 13/887,724, filed May 6, 2013 and published Nov. 14, 2013 as U.S. Publication No. US-2013-0298866; Ser. No. 13/852,190, filed Mar. 28, 2013 and published Aug. 29, 2013 as U.S. Publication No. US-2013-0222593; Ser. No. 13/851,378, filed Mar. 27, 2013, now U.S. Pat. No. 9,319,637; Ser. No. 13/848,796, filed Mar. 22, 2012 and published Oct. 24, 2013 as U.S. Publication No. US-2013-0278769; Ser. No. 13/847,815, filed Mar. 20, 2013 and published Oct. 31, 2013 as U.S. Publication No. US-2013-0286193; Ser. No. 13/800,697, filed Mar. 13, 2013 and published Oct. 3, 2013 as U.S. Publication No. US-2013-0258077; Ser. No. 13/785,099, filed Mar. 5, 2013 and published Sep. 19, 2013 as U.S. Publication No. US-2013-0242099; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013 and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. US-2013-0002873, and/or U.S. provisional applications, Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/942,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; and/or Ser. No. 61/810,407, filed Apr. 10, 2013, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757, 109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for displaying video images for a vehicular vision system, said method comprising:
    providing a plurality of cameras at a vehicle so as to have respective fields of view exterior of the vehicle;
    wherein the provided plurality of cameras comprises a forward viewing camera having at least a forward field of view forward of the vehicle, a rearward viewing camera having at least a rearward field of view rearward of the vehicle, a driver-side sideward viewing camera having at least a sideward field of view at a driver side of the vehicle and a passenger-side sideward viewing camera having at least a sideward field of view at a passenger side of the vehicle;
    providing an electronic control unit at the vehicle, wherein each camera of the provided plurality of cameras is in communication with the electronic control unit via a respective video data line;
    providing a vehicle network at the vehicle, wherein each camera of the provided plurality of cameras is in communication with the other cameras of the provided plurality of cameras via the vehicle network;
    wherein one camera of the provided plurality of cameras functions as a master camera and other cameras of the provided plurality of cameras function as slave cameras;
    wherein, during a driving maneuver of the vehicle, and responsive to the type of driving maneuver of the vehicle, one of the cameras of the provided plurality of cameras is designated as and functions as the master camera and at least some other cameras of the provided plurality of cameras are designated as and function as slave cameras;
    during the driving maneuver of the vehicle, (i) enabling, via a first control signal from the electronic control unit, automatic control of exposure, gain and white balance of the designated master camera and (ii) disabling, via respective second control signals from the electronic control unit, automatic control of exposure, gain and white balance of the designated slave cameras;
    during the driving maneuver of the vehicle, communicating the exposure, gain and white balance parameters of the designated master camera from the designated master camera to the designated slave cameras via the vehicle network, whereby exposure, gain and white balance of the designated slave cameras is controlled in accordance with the enabled automatic control of exposure, gain and white balance parameters of the designated master camera;
    during the driving maneuver of the vehicle, capturing video image data with the provided plurality of cameras;
    providing video image data captured by the provided plurality of cameras during the driving maneuver of the vehicle to the electronic control unit via respective video image data lines connecting the respective cameras and the electronic control unit;
    processing, at the electronic control unit, video image data captured by the provided plurality of cameras during the driving maneuver of the vehicle;
    responsive to processing of captured video image data, synthesizing composite video images derived from video image data captured by at least the designated master camera and the designated slave cameras; and
    displaying the composite video images at a display device of the vehicle for viewing by a driver of the vehicle during the driving maneuver of the vehicle, wherein the composite video images comprise bird's eye view video images derived from video image data captured by at least the designated master camera and the designated slave cameras.

2. The method of claim 1, wherein, responsive to the electronic control unit making a viewing mode change, selecting, via the electronic control unit, which of the provided plurality of cameras that will be designated as the master camera, and sending configuration commands to at least some of the provided plurality of cameras to re-configure them to function as the master camera or as a slave camera, respectively.

3. The method of claim 1, wherein borders of adjacent image sections of the composite video images, when displayed at the display device of the vehicle for viewing by the driver of the vehicle during the driving maneuver of the vehicle, appear uniform in brightness at the borders of the adjacent image sections.

4. The method of claim 1, wherein borders of adjacent image sections of the composite video images, when displayed at the display device of the vehicle for viewing by the driver of the vehicle during the driving maneuver of the vehicle, appear uniform in color at the borders of the adjacent image sections.

5. The method of claim 1, wherein the composite video images comprise bird's eye view video images derived from video image data captured by the rearward viewing camera, the driver-side sideward viewing camera, the forward viewing camera and the passenger-side sideward viewing camera during the driving maneuver of the vehicle.

6. The method of claim 1, comprising, when the driving maneuver of the vehicle comprises a forward driving maneuver, designating the forward viewing camera as the master camera and disabling automatic control of exposure, gain and white balance of at least the rearward viewing camera.

7. The method of claim 1, comprising, when the driving maneuver of the vehicle comprises a rearward driving maneuver, designating the rearward viewing camera as the master camera and disabling automatic control of exposure, gain and white balance of at least the forward viewing camera.

8. The method of claim 1, comprising, when the driving maneuver of the vehicle comprises a forward driving maneuver, (i) designating the forward viewing camera as the master camera, (ii) designating the rearward viewing camera, the driver-side sideward viewing camera and the passenger-side sideward viewing camera as slave cameras, and (iii) communicating, via the vehicle network, exposure, gain and white balance parameters from the forward viewing camera to the rearward viewing camera, the driver-side sideward viewing camera and the passenger-side sideward viewing camera.

9. The method of claim 1, comprising, when the driving maneuver of the vehicle comprises a reversing maneuver, (i)

designating the rearward viewing camera as the master camera, (ii) designating the forward viewing camera, the driver-side sideward viewing camera and the passenger-side sideward viewing camera as slave cameras, and (iii) communicating, via the vehicle network, exposure, gain and white balance parameters from the rearward viewing camera to the forward viewing camera, the driver-side sideward viewing camera and the passenger-side sideward viewing camera.

10. The method of claim 1, wherein each of the provided plurality of cameras is operable to (i) automatically control its exposure, gain and white balance responsive to the first control signal received from the electronic control unit and (ii) disable automatic control of its exposure, gain and white balance responsive to the respective second control signal received from the electronic control unit.

11. A method for displaying video images for a vehicular vision system, said method comprising:
providing a plurality of cameras at a vehicle so as to have respective fields of view exterior of the vehicle;
wherein the provided plurality of cameras comprises a forward viewing camera having at least a forward field of view forward of the vehicle, a rearward viewing camera having at least a rearward field of view rearward of the vehicle, a driver-side sideward viewing camera having at least a sideward field of view at a driver side of the vehicle and a passenger-side sideward viewing camera having at least a sideward field of view at a passenger side of the vehicle;
providing an electronic control unit at the vehicle, wherein each camera of the provided plurality of cameras is in communication with the electronic control unit via a respective video data line;
providing a vehicle network at the vehicle, wherein each camera of the provided plurality of cameras is in communication with the other cameras of the provided plurality of cameras via the vehicle network;
wherein one camera of the provided plurality of cameras functions as a master camera and other cameras of the provided plurality of cameras function as slave cameras;
wherein, during a forward parking maneuver of the vehicle, the forward viewing camera is designated as and functions as the master camera and at least some other cameras of the provided plurality of cameras are designated as and function as slave cameras;
during the forward parking maneuver of the vehicle, (i) enabling, via a first control signal from the electronic control unit, automatic control of exposure, gain and white balance of the designated master camera and (ii) disabling, via respective second control signals from the electronic control unit, automatic control of exposure, gain and white balance of the designated slave cameras;
during the forward parking maneuver of the vehicle, communicating the exposure, gain and white balance parameters of the designated master camera from the designated master camera to the designated slave cameras via the vehicle network, whereby exposure, gain and white balance of the designated slave cameras is controlled in accordance with the enabled automatic control of exposure, gain and white balance parameters of the designated master camera;
during the forward parking maneuver of the vehicle, capturing video image data with the provided plurality of cameras;

providing video image data captured by the provided plurality of cameras during the forward parking maneuver of the vehicle to the electronic control unit via respective video image data lines connecting the respective cameras and the electronic control unit;
processing, at the electronic control unit, video image data captured by the provided plurality of cameras during the forward parking maneuver of the vehicle;
responsive to processing of captured video image data, synthesizing composite video images derived from video image data captured by at least the designated master camera and the designated slave cameras; and
displaying the composite video images at a display device of the vehicle for viewing by a driver of the vehicle during the forward parking maneuver of the vehicle, wherein the composite video images comprise bird's eye view video images derived from video image data captured by at least the designated master camera and the designated slave cameras; and
wherein borders of adjacent image sections of the composite video images, when displayed at the display device of the vehicle for viewing by the driver of the vehicle during the forward parking maneuver, appear uniform in at least one selected from the group consisting of (i) brightness at the borders of the adjacent image sections and (ii) color at the borders of the adjacent image sections.

12. The method of claim 11, wherein borders of adjacent image sections of the composite video images, when displayed at the display device of the vehicle for viewing by the driver of the vehicle during the forward parking maneuver of the vehicle, appear uniform in brightness at the borders of the adjacent image sections.

13. The method of claim 11, wherein borders of adjacent image sections of the composite video images, when displayed at the display device of the vehicle for viewing by the driver of the vehicle during the forward parking maneuver of the vehicle, appear uniform in color at the borders of the adjacent image sections.

14. The method of claim 11, wherein the composite video images comprise bird's eye view video images derived from video image data captured by the rearward viewing camera, the driver-side sideward viewing camera, the forward viewing camera and the passenger-side sideward viewing camera during the forward parking maneuver of the vehicle.

15. The method of claim 11, comprising, during the forward parking maneuver of the vehicle, (i) designating the rearward viewing camera, the driver-side sideward viewing camera and the passenger-side sideward viewing camera as slave cameras, and (ii) communicating, via the vehicle network, exposure, gain and white balance parameters from the forward viewing camera to the rearward viewing camera, the driver-side sideward viewing camera and the passenger-side sideward viewing camera.

16. The method of claim 11, wherein each of the provided plurality of cameras is operable to (i) automatically control its exposure, gain and white balance responsive to the first control signal received from the electronic control unit and (ii) disable automatic control of its exposure, gain and white balance responsive to the respective second control signal received from the electronic control unit.

17. A method for displaying video images for a vehicular vision system, said method comprising:
providing a plurality of cameras at a vehicle so as to have respective fields of view exterior of the vehicle;
wherein the provided plurality of cameras comprises a forward viewing camera having at least a forward field of view forward of the vehicle, a rearward viewing camera having at least a rearward field of view rearward of the vehicle, a driver-side sideward viewing camera having at least a sideward field of view at a driver side of the vehicle and a passenger-side sideward viewing camera having at least a sideward field of view at a passenger side of the vehicle;

providing an electronic control unit at the vehicle, wherein each camera of the provided plurality of cameras is in communication with the electronic control unit via a respective video data line;

providing a vehicle network at the vehicle, wherein each camera of the provided plurality of cameras is in communication with the other cameras of the provided plurality of cameras via the vehicle network;

wherein one camera of the provided plurality of cameras functions as a master camera and other cameras of the provided plurality of cameras function as slave cameras;

wherein, during a rearward parking maneuver of the vehicle, the rearward viewing camera is designated as and functions as the master camera and at least some other cameras of the provided plurality of cameras are designated as and function as slave cameras;

during the rearward parking maneuver of the vehicle, (i) enabling, via a first control signal from the electronic control unit, automatic control of exposure, gain and white balance of the designated master camera and (ii) disabling, via respective second control signals from the electronic control unit, automatic control of exposure, gain and white balance of the designated slave cameras;

during the rearward parking maneuver of the vehicle, communicating the exposure, gain and white balance parameters of the designated master camera from the designated master camera to the designated slave cameras via the vehicle network, whereby exposure, gain and white balance of the designated slave cameras is controlled in accordance with the enabled automatic control of exposure, gain and white balance parameters of the designated master camera;

during the rearward parking maneuver of the vehicle, capturing video image data with the provided plurality of cameras;

providing video image data captured by the provided plurality of cameras during the rearward parking maneuver of the vehicle to the electronic control unit via respective video image data lines connecting the respective cameras and the electronic control unit;

processing, at the electronic control unit, video image data captured by the provided plurality of cameras during the rearward parking maneuver of the vehicle;

responsive to processing of captured video image data, synthesizing composite video images derived from video image data captured by at least the designated master camera and the designated slave cameras; and displaying the composite video images at a display device of the vehicle for viewing by a driver of the vehicle during the rearward parking maneuver of the vehicle, wherein the composite video images comprise bird's eye view video images derived from video image data captured by at least the designated master camera and the designated slave cameras; and wherein borders of adjacent image sections of the composite video images, when displayed at the display device of the vehicle for viewing by the driver of the vehicle during the rearward parking maneuver, appear uniform in at least one selected from the group consisting of (i) brightness at the borders of the adjacent image sections and (ii) color at the borders of the adjacent image sections.

18. The method of claim 17, wherein borders of adjacent image sections of the composite video images, when displayed at the display device of the vehicle for viewing by the driver of the vehicle during the rearward parking maneuver of the vehicle, appear uniform in brightness at the borders of the adjacent image sections.

19. The method of claim 17, wherein borders of adjacent image sections of the composite video images, when displayed at the display device of the vehicle for viewing by the driver of the vehicle during the rearward parking maneuver of the vehicle, appear uniform in color at the borders of the adjacent image sections.

20. The method of claim 17, wherein the composite video images comprise bird's eye view video images derived from video image data captured by the rearward viewing camera, the driver-side sideward viewing camera, the forward viewing camera and the passenger-side sideward viewing camera during the rearward parking maneuver of the vehicle.

21. The method of claim 17, comprising, during the rearward parking maneuver of the vehicle, (i) designating the forward viewing camera, the driver-side sideward viewing camera and the passenger-side sideward viewing camera as slave cameras, and (ii) communicating, via the vehicle network, exposure, gain and white balance parameters from the rearward viewing camera to the forward viewing camera, the driver-side sideward viewing camera and the passenger-side sideward viewing camera.

22. The method of claim 17, wherein each of the provided plurality of cameras is operable to (i) automatically control its exposure, gain and white balance responsive to the first control signal received from the electronic control unit and (ii) disable automatic control of its exposure, gain and white balance responsive to the respective second control signal received from the electronic control unit.

* * * * *